United States Patent [19]

Kwack

[11] Patent Number: 4,939,825
[45] Date of Patent: Jul. 10, 1990

[54] LIGHTWEIGHT TENTER FRAME CLIP
[75] Inventor: Tae H. Kwack, Fairport, N.Y.
[73] Assignee: Mobil Oil Corporation, New York, N.Y.
[21] Appl. No.: 349,677
[22] Filed: May 10, 1989
[51] Int. Cl.⁵ .............................................. D06C 3/04
[52] U.S. Cl. ........................................................ 26/93
[58] Field of Search ...................................... 26/89–96

[56] References Cited
FOREIGN PATENT DOCUMENTS
2817164 10/1979 Fed. Rep. of Germany .......... 26/93
1186828 4/1970 United Kingdom .................... 26/93

Primary Examiner—Werner H. Schroeder
Assistant Examiner—Bradley Kurtz DeSandro
Attorney, Agent, or Firm—Alexander J. McKillop; Charles J. Speciale

[57] ABSTRACT

A tenter frame clip which is at least partially constituted from a lightweight polymeric composite material. The clips are employed in tenter frames as components of clip-chain assemblies for grippingly engaging and advancing thermoplastic film webs, fabrics or foils through the tenter frame as the web is concurrently transversely stretched, and for the most part, are generally constituted from either cast iron or cast steel, depending upon the type and size of tenter frame may each readily weigh as much as five pounds, and even higher. The clips are usually extremely strong and tough in their construction and are each able to exert a gripping force of up to 1500 to 2500 pounds.

6 Claims, 1 Drawing Sheet

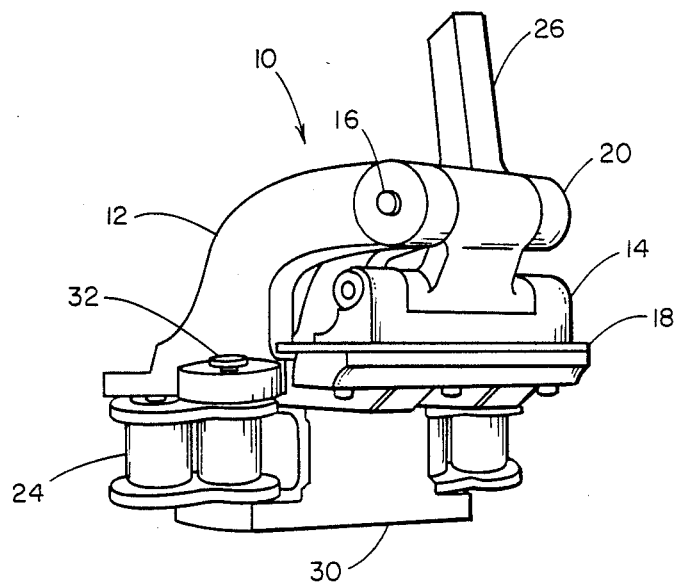

LIGHTWEIGHT TENTER FRAME CLIP

BACKGROUND OF THE INVENTION

1. Field of the Invention

The present invention relates to a tenter frame construction, and more particularly, pertains to a novel tenter frame clip which is at least partially constituted from a lightweight polymeric composite material.

In essence, clips which are employed in tenter frames as components of clip-chain assemblies for grippingly engaging and advancing thermoplastic film webs, fabrics or foils through the tenter frame as the web is concurrently transversely stretched, are generally constituted from either cast iron or cast steel, depending upon the type and size of tenter frame may each readily weigh as much as five pounds, and even higher. The clips are usually extremely strong and tough in their construction and are each able to exert a gripping force of up to 1500 to 2500.

Inasmuch as each tenter frame may incorporate hundreds of such clips, and possibly at times even thousands of clips, and their ancillary equipment, it becomes readily evident that the overall weight which is represented by the multiplicity of clips is quite considerable, and necessitates an extensive amount of electric power and heavy drive units, such as motors and the like, for a tenter frame drive. Similarly, the utilization of a large quantity of such heavy clips, which generate considerable frictional forces when slidingly contacting support rails on the tenter frames, necessitates the installation of either wear strips on the surfaces of the supporting rails along which the clips are conducted and with which they come into sliding contact, or the need for the constant or frequent application of large amounts of liquid lubricants, oils or grease between the contacting sliding surfaces, to thereby reduce friction to tenable levels.

In order to reduce the weights of such clips, thereby resulting in an overall reduction in the weight of the movable constituents of a tenter frame installation, so as to thereby lower the electric power consumption for the operation thereof, and possibly allow for the utilization of smaller-sized drive motors and components, with attendant savings in material and costs, it may be expedient, pursuant to the present invention, to construct at least parts of each of the clips from a lightweight polymeric composite material possessing a high level of strength, toughness and thermal stability generally commensurate with the properties evidenced by the heavier-weight cast iron or cast steel constructions.

2. Discussion of the Prior Art

In essence, although numerous types of tenter frame clip constructions are presently known and employed in this technology, none of these contemplate the use of relatively lightweight polymeric materials with regard to the clip structures.

Lechner U.S. Pat. No. 4,658,482 discloses a tenter frame clip which is designed to incorporate various plastic components; however, these are primarily for the purpose of contacting metallic rail surfaces so as to attenuate or dampen the level of vibration which is encountered during operation, so as to increase service life and reduce noise levels.

Similarly, Ida, et al. U.S. Pat. No. 3,789,975 discloses a tenter frame clip unit having a resilient plate member but does not pertain to the utilization of a lightweight polymeric material in this construction in order to provide for savings in weight.

Takasaki U.S. Pat. No. 3,789,468 discloses a tenter clip for tenter frames, wherein the clip grippingly engages a thermoplastic film web and which conceivably may incorporate plastic components. However, there is no specific reference to the use or installation of such materials.

Finally, Dornier, et al. U.S. Pat. No. 3,638,289 discloses a tenter frame assembly including a clip unit which is adapted to slidingly contact various frame components, but does not provide for utilization of a polymeric material to reduce the overall weight of the installation.

SUMMARY OF THE INVENTION

Accordingly, it is an object of the present invention to provide a novel clip construction for a tenter frame of the type under consideration herein, in which at least some of the parts or constituents of the clip are constituted from a lightweight polymeric composite material tending to reduce the overall weight of the clip, and resultingly that the tenter frame, without adversely affecting the strength and toughness thereof.

BRIEF DESCRIPTION OF THE DRAWINGS

Reference may now be had to the following description of a preferred embodiment of the invention, taken in conjunction with the accompanying single figure of drawing illustrating a cross-sectional view through a tenter clip as the latter is being conveyed along a supporting rail of a tenter frame.

DETAILED DESCRIPTION

Referring in detail to the single figure of drawing, the tenter clip 10 incorporates the usual tenter frame clip constituents, such as a clip top 12, a jaw shoe 14, a jaw pin 16, a clip arm 20, a plate 18, a clip lever arm 26, and a clip base 30, connecting links 24, and connecting pins 32. These components are not described in detail herein. The detailed design may vary slightly depending on specific requirements, however, the structures of the components are basic in nature and widely employed in the tenter clip technology. Presently, although these parts are made of material, metallic in basic, either cast iron or cast steel, most of these parts may each be constituted from the inventive lightweight high temperature resistant polymeric composite materials.

To that extent, suitable lightweight but high strength polymeric materials, which may be employed for the components of tenter frame clips may be either composite materials whose basic material is polyamides, polyimides, polyetherimides, polyetheretherketone, polyphenylene sulfide, or polyethersulphone, among other comparable materials.

The lightweight tenter frame clip components of polymer may be produced through either injection molding, reaction-injection molding, transfer molding, and compression molding, as desired depending upon the contemplated physical application to a tenter frame, suitably reinforced with high strength polymeric fibers, glass fibers, or other strengthening components.

From the foregoing, it becomes readily apparent that the inventive tenter clips, although in strength and toughness equaling those which are constituted from either cast iron or cast steel, may be of a considerably lower weight, possibly at a weight reduction of up to 50% or more, and thereby considerably curtailing the need for electrical power required for the tenter frame drive. This will enable the drive for the tenter frame to be constructed smaller in size and thereby less expensive, while possibly also enabling the installation of a clip-chain arrangement which is lighter in weight.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described nor to anything less than the whole of the invention herein disclosed as hereinafter claimed.

What is claimed is:

1. In a tenter frame for the transverse stretching of an advancing web of a thermoplastic film material, fabric or foil, said tenter frame including a clip chain assembly having clips for engaging said webs, and chain links connected to said clips for moving the assembly along supporting rails; the improvement comprising in that at least some components of each of said clips are constituted from a lightweight polymeric material so as to reduce the weight of said clips.

2. A tenter frame as claimed in claim 1, wherein said polymeric material is selected from the group of materials consisting of polyamides, polyimides, polyetherimides, polyetheretherketone, polyphenylene sulfide and polyethersulphone.

3. A tenter frame as claimed in claim 2, wherein said polymeric material is a composite fiber-reinforced material.

4. A tenter frame as claimed in claim 2, wherein said polymeric material is a composite glass-reinforced material.

5. A tenter frame as claimed in claim 2, wherein said polymeric material is a composite glass or other fiber reinforced material.

6. A tenter frame as claimed in claim 1, wherein each said clip comprises a clip top portion, base portion and clip jaw, at least said top portion and said clip jaw being constituted from said polymeric material.

* * * * *